N. W. Pomeroy,

Oil Can.

No. 3,154. Reissued Oct. 6, 1868.

N. PETERS, PHOTO-LITHOGRAPHER, WASHINGTON, D. C.

ABLE COPY

UNITED STATES PATENT OFFICE.

EDWARD MILLER, OF MERIDEN, CONNECTICUT, ASSIGNEE OF NORMAN W. POMEROY, OF SAME PLACE.

IMPROVEMENT IN LUBRICATORS.

Specification forming part of Letters Patent No. 15,775, dated September 23, 1856; Reissue No. 3,154, dated October 6, 1868.

*To all whom it may concern:*

Be it known that NORMAN W. POMEROY, of Meriden, in the county of New Haven and State of Connecticut, has invented a new Improvement in Lubricators; and I do hereby declare the following, when taken in connection with the accompanying drawings and the letters of reference marked thereon, to be a full, clear, and exact description of the same, and which said drawings constitute part of this specification, and represent, in—

Figure 1:
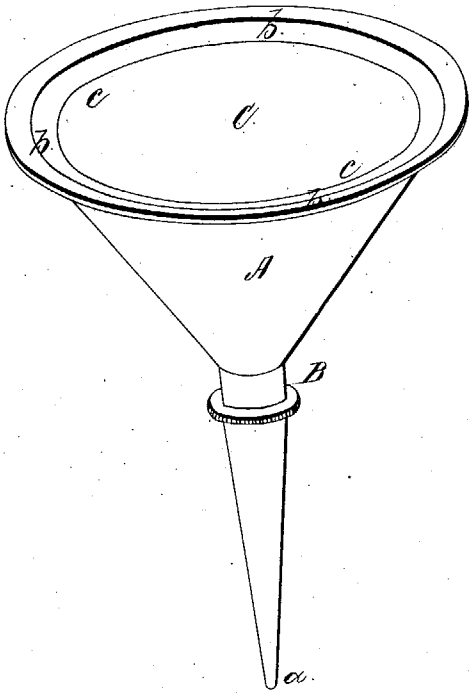
Figure 2:
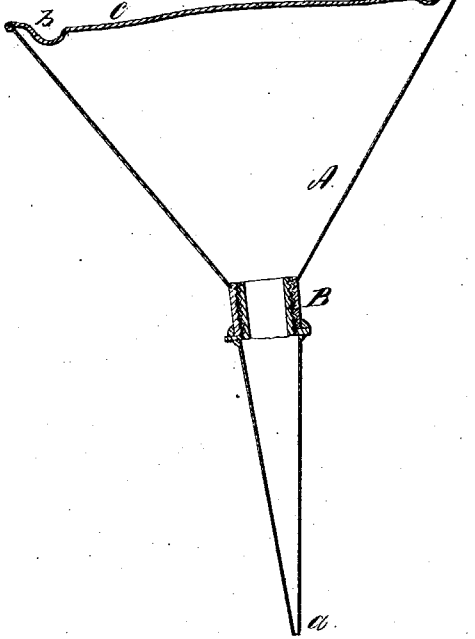

Figure 1, a perspective view of the oiler, showing its general form and appearance; and in Fig. 2, a plan of the same, cut vertically through the center, showing the peculiar shape of the elastic disk.

This improvement consists in making the elastic disk which serves as the bottom of the oil-vessel of thin sheet-brass or other elastic sheet metal, in such a shape and so connect it with the other part of the oil-vessel that its center may be easily pressed inward to force out the oil, but so that it will instantly resume its original position when the pressure is removed, so that it will have the effect to alternately force out the oil and admit the air in as rapid succession as may be desired or as the hand can work.

To enable others to construct and use this improvement, I will proceed to describe the same as illustrated in the accompanying drawings.

The body or cup A of the oiler I form from any suitable metal and of any desirable form, to which a tube of any known construction is attached at B in any convenient manner, and an outlet at *a* for the discharge of oil, as in oilers of common construction. The bottom C, I form from any suitable metal, preferring rolled or planished sheet-brass, and of the requisite size for attachment to the lower edge of the cup, and formed so that when the thumb is placed upon the bottom the bottom may be forced inward, and when the thumb is removed the elasticity of the bottom will return it to its original position. This is best done by making the bottom slightly concavo-convex, having the convex surface upon the outside. The bottom is attached to the cup, so that the edge around the bottom will project sufficiently far below the bottom as to support the cup entirely upon its edge and not permit the surface of the bottom to bear when the cup is set upright. This is best done by turning the edge of the elastic bottom downward, so as to be joined onto the edge of the cup, as seen in Fig. 2, but may be attached to the cup at a little distance above the lower edge of the cup, so that the edge of the cup itself will form the bearing for the oiler to rest upon when standing upright.

To use the cup thus constructed, invert the cup in which oil has been placed, press upon the bottom sufficiently to force it inward, which will cause the ejection of the oil by the compression within the cup, relieving the bottom from the pressure thereon. It will, by its own elasticity, return to its first and natural position, and may be depressed and relieved in like manner until a sufficient quantity of oil has been ejected.

The advantages of this improvement are that the oiler is not liable to get out of order as are those where a spring is employed to force back the bottom when it has been depressed, and the edge of the cup, projecting, as it does, below the bottom, protects the bottom from all wear or liability to injury from being set upright or moved about.

Having fully described this invention, what I claim as the invention of NORMAN W. POMEROY, and desire to secure by Letters Patent, is—

A lubricator the disk of which, forming the bottom thereof, is constructed so that the central part may be readily pressed inward and returned to its original position when relieved from pressure, the said bottom being so attached to the cup as to be protected by the downward edge of the cup, substantially in the manner herein set forth.

EDWARD MILLER,
*Assignee of Norman W. Pomeroy.*

Witnesses:
W. H. PERKINS,
FREDK. I. SEYMOUR.